United States Patent [19]

Vamvakas

[11] Patent Number: 4,463,930

[45] Date of Patent: Aug. 7, 1984

[54] PISTON-TYPE VALVE WITH SLIP CLUTCH ACTUATED LIMIT SWITCH

[76] Inventor: Michael Vamvakas, 2739 Country Club Blvd., Rocky River, Ohio 44116

[21] Appl. No.: 380,040

[22] Filed: May 20, 1982

[51] Int. Cl.³ .............................................. F16K 31/04
[52] U.S. Cl. .................................... 251/134; 192/150; 464/36; 251/326
[58] Field of Search ................. 251/134, 326; 192/150; 464/36

[56] References Cited

U.S. PATENT DOCUMENTS

| 1,883,164 | 10/1932 | Vassakos | 192/150 |
| 2,209,155 | 7/1940 | Fagg | 192/150 |
| 3,608,686 | 9/1971 | Martin, Sr. | 192/150 |
| 4,208,555 | 6/1980 | Ikeda et al. | 192/150 X |

FOREIGN PATENT DOCUMENTS

| 572040 | 3/1933 | Fed. Rep. of Germany | 251/134 |
| 1547154 | 10/1968 | France | 251/134 |

*Primary Examiner*—Arnold Rosenthal
*Attorney, Agent, or Firm*—Baldwin, Egan, Walling & Fetzer

[57] ABSTRACT

A motor-driven piston-type valve including a valve body having a horizontally disposed fluid flow passageway. A valve piston is operatively mounted in the body for vertical movement therein to selectively close and open the passageway. An electric motor is operatively connected to the piston to vertically move the same. A slip clutch is operatively interposed between the motor and the piston whereby clutch slippage is effected when the piston encounters a predetermined resistance in its vertical movement. A limit switch is operatively connected to the clutch for triggering by clutch slippage, such limit switch also being electrically connected to the motor, whereby when the piston encounters a predetermined resistance in its vertical movement, resultant clutch slippage triggers the limit switch to stop the motor.

1 Claim, 7 Drawing Figures

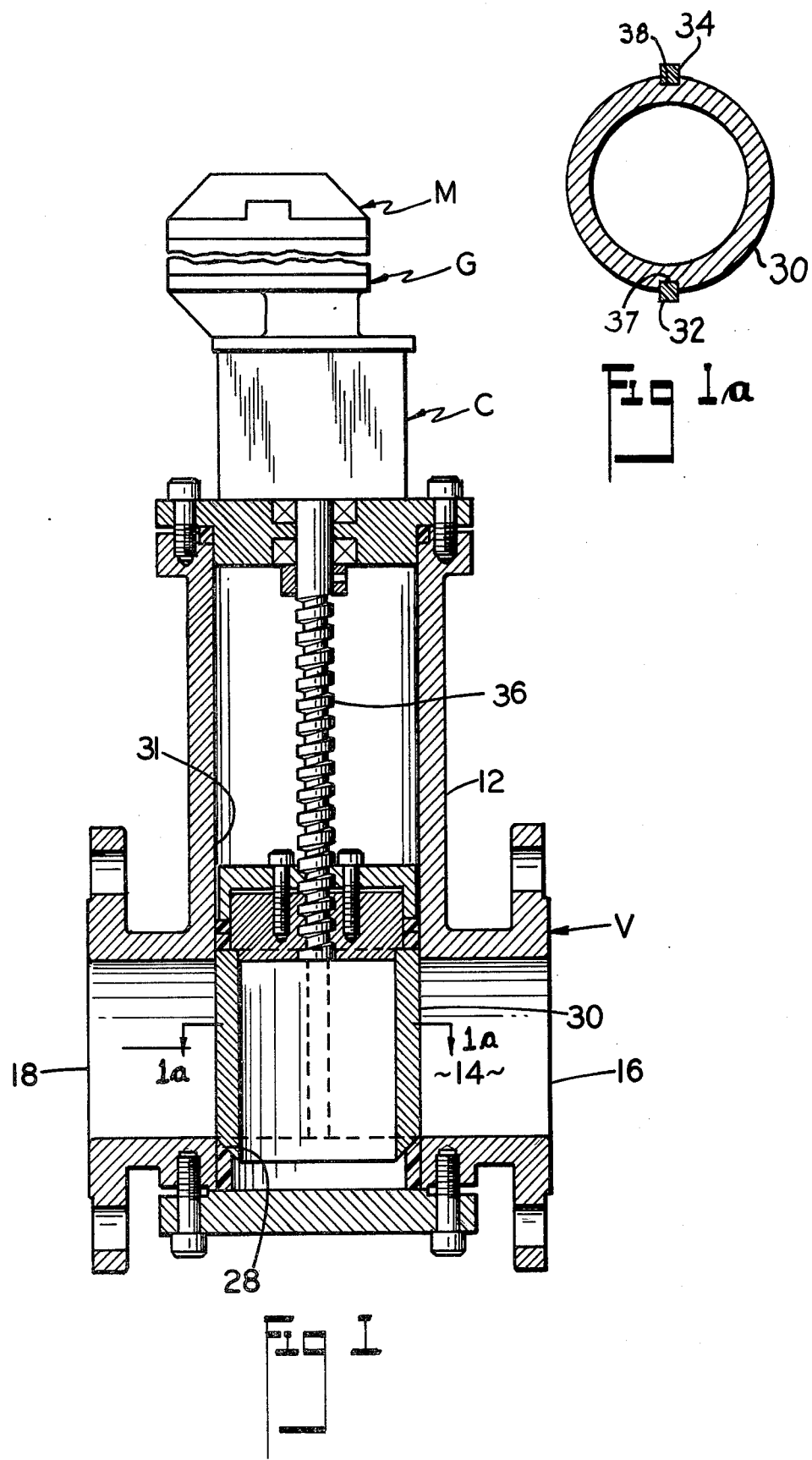

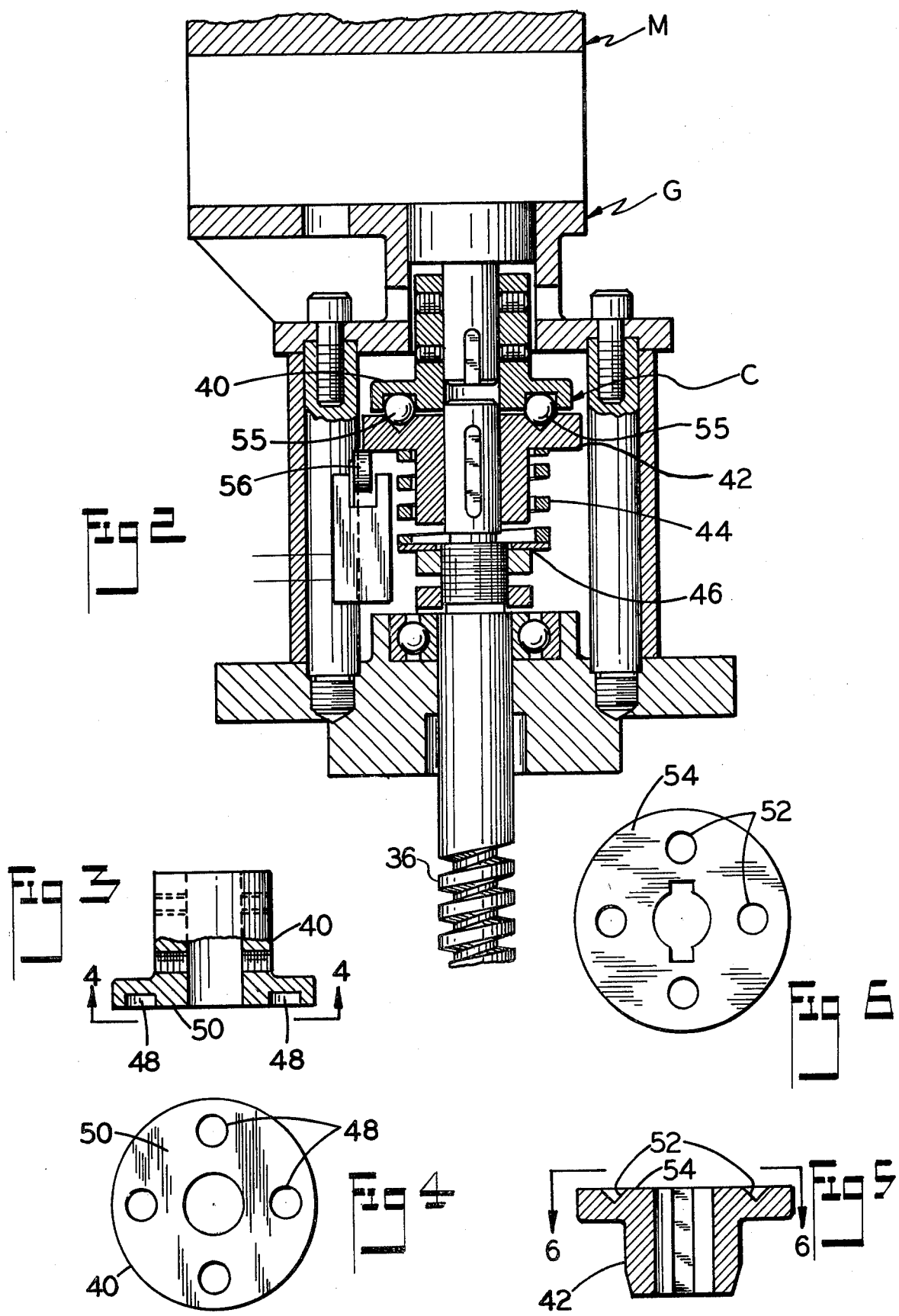

PISTON-TYPE VALVE WITH SLIP CLUTCH ACTUATED LIMIT SWITCH

BACKGROUND OF THE INVENTION

This invention relates to a motor-driven piston-type valve, and more particularly to such a valve having a slip clutch actuated limit switch to shut off the valve motor when the valve piston encounters a predetermined resistance.

The invention is intended particularly for a piston-type valve. Such valve is often used in fluid-flow systems containing various quantities and sizes of debris and solid particles. It is imperative that the valve contains some type of automatic shut-off system which is needed when the valve piston encounters a predetermined resistance on the opening or closing of the valve.

Therefore, it is an object of the invention to provide a motor-driven piston-type valve having an automatic shut-off mechanism to stop valve actuation when the valve piston encounters a predetermined resistance.

A further object is to provide a valve of the above type having a slip-clutch actuated limit switch to shut off the valve motor when the valve piston encounters a predetermined resistance.

A further object of the invention is to provide a valve of the above type that is simple in construction, inexpensive to manufacture, and highly effective in operation.

Briefly the foregoing objects are accomplished by the provision of a motor-driven piston-type valve including a valve body having a horizontally disposed fluid flow passageway. A valve piston is operatively mounted in the valve body for vertical movement therein to selectively close and open the passageway. An electric motor is operatively connected to the piston to vertically move the same. A slip clutch is operatively interposed between the motor and the piston whereby clutch slippage is effected when the piston encounters a predetermined resistance in its vertical movement. A limit switch is operatively connected to the clutch for triggering by clutch slippage, such limit switch also being electrically connected to the motor, whereby when the piston encounters a predetermined resistance in its vertical movement, resultant clutch slippage triggers the limit switch to stop the motor. The slip clutch includes first and second couplings, with bias means urging the couplings together in mated relation. Each coupling has a plurality of coacting circumferentially disposed recesses formed in their opposed mating surfaces, with the recesses in one coupling disposed opposite the recesses in the other coupling. Ball bearings are disposed in the recesses. The recesses in the first coupling are cylindrical-shaped, and the recesses in the second coupling are cone-shaped. The piston is cylindrical-shaped, such piston having a threaded stem connected to the clutch, with the threaded stem also extending through a mated threaded aperture in the valve body whereby motor actuation drives the piston to operate the valve. A gear box is interposed between the motor and the slip clutch to drive the piston at a predetermined speed.

Other objects and advantages of the invention will be apparent from the following description taken in conjunction with the drawings wherein:

FIG. 1 is a front elevational view, partly in section, of a piston-type valve constructed in accordance with the invention;

FIG. 1a is a sectional view taken along line 1a—1a of FIG. 1.

FIG. 2 is an enlarged front elevational sectional view of the slip clutch portion of the valve shown in FIG. 1;

FIG. 3 is a front elevational view, partly in section, of the top coupling of the slip clutch shown in FIG. 2;

FIG. 4 is a view taken along the line 4—4 of FIG. 3;

FIG. 5 is a front elevational sectional view of the bottom coupling of the slip clutch shown in FIG. 2; and FIG. 6 is a view taken along the line 6—6 of FIG. 5.

In the drawings, like numbers and letters are used to identify like and similar parts throughout the several views.

Referring first to FIG. 1, there is shown the basic components of the invention including the motor-driven piston-type valve V having a vertically movable piston 30 which is attached by the screw 36 to a slip clutch C (later to be described in detail). The clutch C is operatively secured to a gearbox G, such gearbox being driven by an electric motor M. In operation, the motor M drives the gearing G, and thence the slip clutch C, and thence the screw 36, to vertically move the piston 30 in the usual manner. The valve V includes a valve body 12 having a horizontally disposed fluid flow passageway 14 with an inlet 16 at one end of the passageway and an outlet 18 at the other end of the passageway.

The valve V also includes the aforementioned valve piston 30 operatively mounted in the body bore 31, in the usual manner, the selective vertical movement to and away from and through the passageway 14, such piston seating on a valve seat 28 to selectively close and open the passageway 14 and thus control fluid flow therethrough as shown in FIG. 1, wherein the valve is shown in closed position.

Disposed in the bore 31 are spaced keys 32 and 34 (FIG. 1a), which are received in the spaced keyways 37, 38, respectively, in the piston outer wall. With this structure, the piston 30 is prevented from turning in a horizontal plane in the bore 31.

The piston 30 has the screw 36 extending out the top of the piston, such screw being secured to the slip clutch C as aforementioned. In operation, the screw 36 does not move vertically.

The valve V, thus far described, is a usual piston-type valve and will not be further described as the same, per se, does not form the invention.

Referring now to FIGS. 2 through 6, there is shown in enlarged detail, the slip clutch C which forms a part of the invention. The clutch C includes a first or top coupling 40 which coacts with a mating second or bottom coupling 42. The couplings are urged together by suitable bias means such as, for example, the coil spring 44 which is compressed between the bottom coupling 42 and the screw nut 46.

The top coupling 40 has a plurality of circumferentially-disposed cylindrical-shaped recesses 48 formed in its lower or mating surface 50 as best shown in FIGS. 3 and 4.

The bottom coupling has a plurality of circumferentially-disposed cone-shaped recesses 52 formed in its upper or mating surface 54 as best shown in FIGS. 5 and 6. The recesses 48 are normally disposed opposite respective recesses 52 and have ball bearings 55 disposed therein as shown in FIG. 2.

A limit switch 56 is operatively connected to the bottom coupling 42 and to the associated motor M in the usual manner.

In operation, if the piston 30 encounters predetermined resistance in its vertical travel, the screw 36 and the lower coupling 42 will stop rotating while, at the same time, the upper coupling 40 will continue to rotate. This action causes the ball bearings 55 to ride out of the cone-shaped recesses 52 in the lower coupling 42, such action causing the lower coupling to depress downwardly against the action of the compressed spring 44, whereby the lower coupling 42 will then trigger the limit switch 56 and shut off the motor M.

Thus, the invention discloses the combination of a motor-driven piston-type valve V having a linearly movable valve piston 30, a slip clutch C operatively position on the valve V whereby clutch slippage is effected when the piston 30 encounters predetermined resistance in its linear movement, and a limit switch 56 operatively connected to the clutch C and to an associated motor M which drives the piston 30 whereby clutch slippage triggers the limit switch 56 which, in turn, shuts off the associated motor M when the piston 30 encounters predetermined resistance.

The invention also discloses a piston-type valve V including a valve body 12 having a orizontally disposed fluid flow passageway 14, a valve piston 30 operatively mounted in the body 12 for vertical movement therein to selectively close and open the passageway 14. An electric motor M is operatively connected to the piston 30 to vertically move the same. A slip clutch C is operatively interposed between the motor M and the piston 30 whereby clutch slippage is effected when the piston 30 encounters a predetermined resistance in its vertical movement. A limit switch 56 is operatively connected to the clutch C for triggering by clutch slippage. The limit switch 56 is also electrically connected to the motor M, whereby when the piston 30 encounters a predetermined resistance in its vertical movement, resultant clutch slippage triggers the limit switch 56 to stop the motor M. The slip clutch C also includes first and second couplings 40, 42, and bias means 44 urging the couplings 40, 42, together in mated relation. Each coupling 40, 42 has a plurality of coacting circumferentially-disposed recesses 48, 52, respectively, formed in their opposed mating surfaces 50, 54, respectively, with the recesses in one coupling disposed opposite the recesses in the other coupling. Ball bearings 55 are disposed in such mating recesses. The recesses in the first coupling 40 are cylindrical-shaped, and the recesses in the second coupling 42 are cone-shaped. The piston 30 is cylindrical-shaped. The piston 30 has a threaded stem or screw 36 connected to the second coupling 42 of the clutch, whereby motor actuation drives the piston 30 to operate the valve V. A gearbox G is interposed between the motor M and the slip clutch C to drive the piston 30 at a predetermined speed.

Also, it is to be understood that the motor M may be replaced by a handwheel so that the valve V may be operated manually.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

What is claimed is:

1. A piston-type valve comprising; a valve body having a horizontally disposed fluid flow passageway, a valve piston operatively mounted in said body for vertical movement therein to selectively close and open said passageway, an electric motor operatively connected to said piston to vertically move the same, a slip clutch operatively interposed between the motor and the piston whereby clutch slippage is effected when the piston encounters a predetermined resistance in its vertical movement, a limit switch operatively connected to the clutch for triggering by clutch slippage, said limit switch also being electrically connected to the motor, whereby when the piston encounters a predetermined resistance in its vertical movement resultant clutch slippage triggers the limit switch to stop the motor, said slip clutch including first and second couplings, bias means urging said couplings together in mated relation, each coupling having a plurality of coacting circumferentially disposed recesses formed in their opposed mating surfaces with the recesses in one coupling disposed opposite the recesses in the other coupling, ball bearings disposed in said recesses, the recesses in said first coupling being cylindrical-shaped, the recesses in said second coupling being cone-shaped, said piston being cylindrical-shaped, said piston having a threaded stem connected to the second coupling of the clutch, whereby motor actuation drives the piston to operate the valve, and a gearbox interposed between the motor and the slip clutch to drive the piston at a predetermined speed.

* * * * *